(12) United States Patent
Nishitani et al.

(10) Patent No.: US 7,580,341 B2
(45) Date of Patent: Aug. 25, 2009

(54) ADDRESS-INFORMATION RECORDING METHOD AND APPARATUS, AND OPTICAL RECORDING MEDIUM

(75) Inventors: Masayoshi Nishitani, Kanagawa-ken (JP); Seiji Higurashi, Tokyo-to (JP)

(73) Assignee: Victor Company of Japan, Ltd., Yokohama (JP)

( * ) Notice: Subject to any disclaimer, the term of this patent is extended or adjusted under 35 U.S.C. 154(b) by 478 days.

(21) Appl. No.: 11/406,403

(22) Filed: Apr. 19, 2006

(65) Prior Publication Data
US 2006/0256681 A1    Nov. 16, 2006

(30) Foreign Application Priority Data
May 11, 2005    (JP)    ............................. 2005-137989

(51) Int. Cl.
*G11B 7/24*    (2006.01)
(52) U.S. Cl. ................. 369/275.4; 369/47.15
(58) Field of Classification Search ........................ None
See application file for complete search history.

(56) References Cited

U.S. PATENT DOCUMENTS

| | | | |
|---|---|---|---|
| 6,320,831 B1 * | 11/2001 | Inoue et al. .............. | 369/47.22 |
| 6,690,640 B1 * | 2/2004 | Van Den Enden ........ | 369/275.4 |
| 7,221,641 B2 * | 5/2007 | Noda et al. ............... | 369/275.3 |
| 2001/0000698 A1 * | 5/2001 | Aoki ........................ | 369/47.47 |
| 2004/0246863 A1 * | 12/2004 | Ando et al. .............. | 369/59.22 |

FOREIGN PATENT DOCUMENTS

| | | |
|---|---|---|
| JP | 2000-040309 | 2/2000 |
| JP | 2003-036544 | 2/2003 |

* cited by examiner

*Primary Examiner*—Joseph H Feild
*Assistant Examiner*—Henok G Heyi
(74) *Attorney, Agent, or Firm*—Louis Woo

(57) ABSTRACT

Address information is recorded on an optical recording medium having groove portions and land portions. The groove portions form a recording track and are spaced at a constant track pitch. The land portions extend between the groove portions. The address information represents the positions of places on the optical recording medium. The recording of the address information is implemented as follows. The address information is converted into words of a self-synchronizable code. The words of the self-synchronizable code are subjected to bi-phase modulation to generate a bi-phase-modulation-result signal. The bi-phase modulation causes frequency modulation. Thus, the bi-phase-modulation-result signal is a frequency-modulation-result signal. The frequency-modulation-result signal is recorded on at least one sides of the groove portions to form wobble of the recording track.

11 Claims, 6 Drawing Sheets

| BEFORE-MODULATION SIGNAL | AFTER-MODULATION SIGNAL |
|---|---|
| "1" | "10" OR "01" |
| "0" | "00" OR "11" |

| BEFORE-MODULATION SIGNAL | 011110 |
|---|---|
| AFTER-MODULATION SIGNAL | 001010101011 |

ADDRESS-INFORMATION RECORDING METHOD AND APPARATUS, AND OPTICAL RECORDING MEDIUM

BACKGROUND OF THE INVENTION

1. Field of the Invention

This invention generally relates to an address-information recording method and an optical recording medium. This invention particularly relates to a method of recording address information on an optical recording medium, that is, an optically-scannable information carrier. In addition, this invention particularly relates to an optically-scannable information carrier (an optical recording medium) having recorded address information. Furthermore, this invention relates to an apparatus for address information recorded on an optical recording medium.

2. Description of the Related Art

A DVD-R (digital versatile disc recordable) or a DVD-RW (digital versatile disc rewritable) has a spiral groove forming a recording track. The groove wobbles at a constant frequency. A disc drive apparatus utilizes the wobble in generating a reference signal for disc rotation control. The DVD-R or the DVD-RW has recorded address information. Specifically, there are land portions between adjacent portions of the groove as viewed along a radial direction of the disc. The land portions have pits representing address information. These pits are called the land pre-pits. The wobble of the groove and the land pre-pits are in a prescribed relation.

In general, a prior-art drive device for such a DVD-R or a DVD-RW can not accurately read out the address information therefrom until the rotational speed of the disc rises to a rated value.

Japanese patent application publication number 2003-36544 discloses a prior-art optical recording medium which is an information recording carrier having a groove forming a recording track. The groove track has wobbling portions and non-wobbling portions. Each wobbling portion is assigned to an address-information bit of "1" while each non-wobbling portion is assigned to an address-information bit of "0". Accordingly, the prior-art optical recording medium has recorded address information.

In general, a prior-art drive device for the prior-art optical recording medium in Japanese application 2003-36544 can not accurately read out the address information therefrom until the rotational speed of the medium rises to a rated value.

SUMMARY OF THE INVENTION

It is a first object of this invention to provide a method of recording address information on an optical recording medium which can be accurately read out even when the medium is rotated at a speed different from a rated value.

It is a second object of this invention to provide an optical recording medium having recorded address information which can be accurately read out even when the medium is rotated at a speed different from a rated value.

It is a third object of this invention to provide an improved apparatus for address information recorded on an optical recording medium.

A first aspect of this invention provides a method of recording address information on an optical recording medium having groove portions and land portions, the groove portions forming a recording track and being spaced at a constant track pitch, the land portions extending between the groove portions, the address information representing positions of places on the optical recording medium. The method comprises the steps of converting the address information into words of a self-synchronizable code; subjecting the words of the self-synchronizable code to bi-phase modulation causing frequency modulation to generate a frequency-modulation-result signal; and recording the frequency-modulation-result signal on at least one sides of the groove portions to form wobble of the recording track.

A second aspect of this invention is based on the first aspect thereof, and provides a method wherein the self-synchronizable code is a comma-free code.

A third aspect of this invention provides an optical recording medium having groove portions and land portions, the groove portions forming a recording track and being spaced at a constant track pitch, the land portions extending between the groove portions, wherein a frequency-modulation-result signal containing address information is recorded on at least one sides of the groove portions to form wobble of the recording track, the address information representing positions of places on the optical recording medium and being expressed by words of a self-synchronizable code.

A fourth aspect of this invention provides a method comprising the steps of encoding an original address signal into a signal of a self-synchronizable code; and subjecting the signal of the self-synchronizable code to frequency modulation to generate a frequency-modulation-result signal representing track wobble to be formed in an optical recording medium.

A fifth aspect of this invention is based on the fourth aspect thereof, and provides a method further comprising the step of making an optical recording medium in response to the frequency-modulation-result signal, the optical recording medium having the track wobble represented by the frequency-modulation-result signal.

A sixth aspect of this invention provides a method comprising the steps of encoding an original address signal into a signal of a self-synchronizable code; and subjecting the signal of the self-synchronizable code to bi-phase modulation to generate a bi-phase-modulation-result signal representing track wobble to be formed in an optical recording medium.

A seventh aspect of this invention is based on the sixth aspect thereof, and provides a method further comprising the step of making an optical recording medium in response to the bi-phase-modulation-result signal, the optical recording medium having the track wobble represented by the bi-phase-modulation-result signal.

An eighth aspect of this invention provides an apparatus comprising means for encoding an original address signal into a signal of a self-synchronizable code; and means for subjecting the signal of the self-synchronizable code to frequency modulation to generate a frequency-modulation-result signal representing track wobble to be formed in an optical recording medium.

A ninth aspect of this invention is based on the eighth aspect thereof, and provides an apparatus further comprising means for making an optical recording medium in response to the frequency-modulation-result signal, the optical recording medium having the track wobble represented by the frequency-modulation-result signal.

A tenth aspect of this invention provides an apparatus comprising means for encoding an original address signal into a signal of a self-synchronizable code; and means for subjecting the signal of the self-synchronizable code to bi-phase modulation to generate a bi-phase-modulation-result signal representing track wobble to be formed in an optical recording medium.

An eleventh aspect of this invention is based on the tenth aspect thereof, and provides an apparatus further comprising means for making an optical recording medium in response to the bi-phase-modulation-result signal, the optical recording medium having the track wobble represented by the bi-phase-modulation-result signal.

A twelfth aspect of this invention provides an optical recording medium having a recording track with wobble formed in accordance with a bi-phase-modulation-result signal which is generated by the steps of encoding an address signal representative of positions of places in the optical recording medium into a signal of a self-synchronizable code, and subjecting the signal of the self-synchronizable code to bi-phase modulation.

This invention has the following advantages. In this invention, the address information is converted into words of the self-synchronizable code. Then, the words of the self-synchronizable code are subjected to frequency modulation to generate a frequency-modulation-result signal. The frequency-modulation-result signal is recorded as wobble of the recording track on the optical recording medium. Accordingly, even when the rotational speed of the optical recording medium is below a rated value, the address information can be accurately derived from a signal reproduced from the wobble. Thus, the synchronization can be easily and promptly acquired.

In this invention, since the address information is converted into the words of the self-synchronizable code, places in the optical recording medium where the address information should be recorded are not limited to prescribed ones. Therefore, the address information can be recorded while being dispersed over a freely selected area in the optical recording medium.

In this invention, since the address information is recoded on the optical recording medium as the wobble of the recording track, the usable recording capacity of the optical recording medium is prevented from decreasing due to the recording of the address information.

DETAILED DESCRIPTION OF THE INVENTION

Prior-art optical recording mediums will be explained below for a better understanding of this invention.

Figure 1:
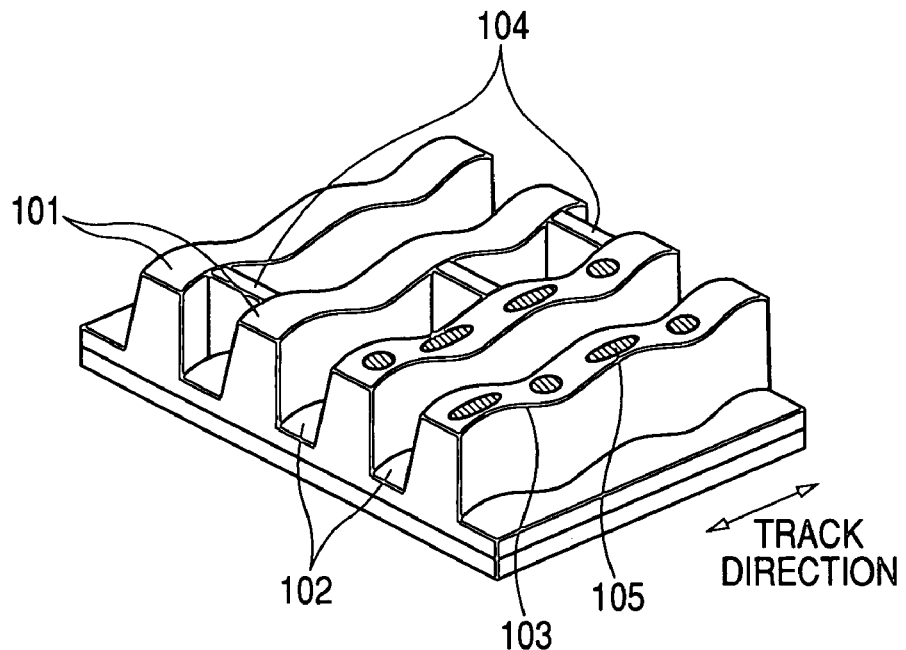
FIG. 1 is a perspective view of a portion of a prior-art DVD-R or DVD-RW.

FIG. 1 shows a prior-art DVD-R or DVD-RW having a spiral guide groove 101 forming a recording track. During the recording of data on the prior-art disc of FIG. 1, a spot of a laser beam emitted from an optical pickup of a prior-art drive device is guided along the groove track 101 while forming recorded marks 105 therein. As viewed along a radial direction of the prior-art disc, adjacent portions of the guide groove 101 are spaced at a constant track pitch. In FIG. 1, there are land portions 102 between the adjacent portions of the guide groove 101. The land portions 102 have previously-formed pits 104 called land pre-pits 104.

The sides of the groove track 101 (or the sides of the land portions 102) wobble in a direction perpendicular to the longitudinal direction of the groove track 101. The wobble of the sides of the groove track 101 is called the groove wobble 103. The frequency of the groove wobble 103 is constant. The prior-art drive device utilizes the groove wobble 103 in generating a reference signal for disc rotation control.

Figure 2:
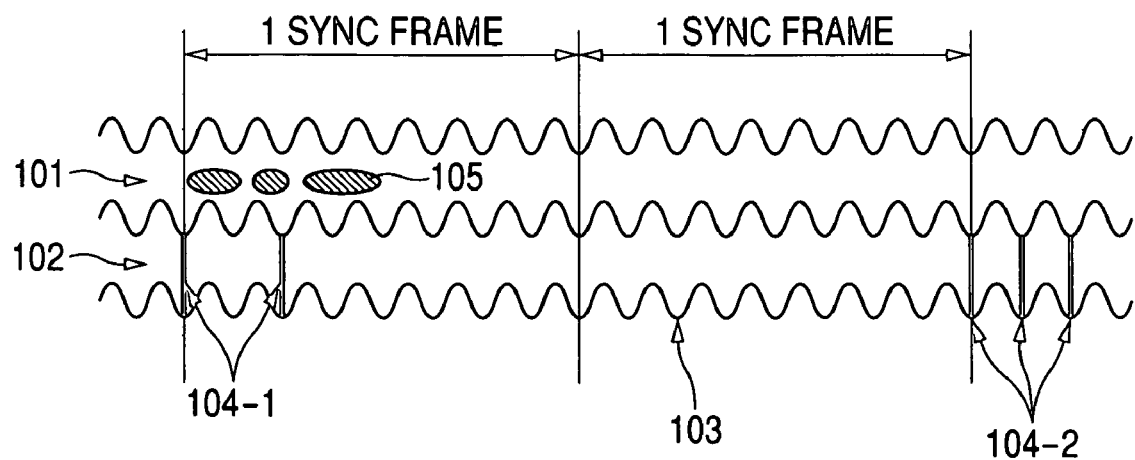
FIG. 2 is a diagram of a groove, a land, wobble, land pre-pits, and recorded marks in the prior-art DVD-R or DVD-RW of FIG. 1.

As shown in FIG. 2, the guide groove 101 has a sequence of portions assigned to sync frames respectively. Similarly, the land 102 has a sequence of portions assigned to sync frames respectively. The groove wobble 103 has a sinusoidal waveform with a frequency equal to 8 times the sync-frame frequency. Accordingly, there are 8 periods (8 waves) of the groove wobble 103 in every sync frame. One, two, or three land pre-pits are provided in a head of every other sync frame. Specifically, one, two, or three land pre-pits are located at one, two, or all of three positions on the land 102 which correspond to the first, second, and third crests of the groove wobble 103 in every other sync frame. In FIG. 2, land pre-pits 104-1 are ones located at positions on the land 102 which correspond to the first and third crests of the groove wobble 103 in a sync frame, and land pre-pits 104-2 are ones located at positions on the land 102 which correspond to the first, second, and third crests of the groove wobble 103 in a later sync frame.

One, two, or three land pre-pits positionally corresponding to the first, second, and third crests of the groove wobble 103 in every other sync frame are arranged in prescribed rules so as to represent information utilized for a data recording procedure. The prescribed rules are designed as follows. In the case where a land pre-pit corresponding to the first crest is present while a land pre-pit corresponding to the second crest is absent, the logic state of an LPP (land pre-pit) data bit (that is, an address information bit) depends on whether a land pre-pit corresponding to the third crest is present or absent. The presence of land pre-pits corresponding to the first and second crests indicates a frame sync signal. In this case, the frame sync signal is of an odd frame or an even frame depending on whether a land pre-pit corresponding to the third crest is present or absent. In FIG. 2, the land pre-pits 104-1 represent an LPP data bit (an address information bit) of "1", whereas the land pre-pits 104-2 indicate a frame sync signal of an even frame.

As explained above, an information bit of "0" or "1" is decoded from one, two, or three land pre-pits corresponding to the first, second, and third crests of the groove wobble 103 in every other sync frame. A prescribed number of land pre-pits 104 represent one bit of address information indicative of the on-disc position of a related segment of the groove track 101. A land pre-pit corresponding to the first crest of the groove wobble 103 in every other sync frame is always present. Thus, a land pre-pit corresponding to the first crest can be utilized by the prior-art drive device for phase correction of a recording clock signal.

The prior-art drive device includes a phase locked loop (PLL) circuit for generating a reproducing clock signal in response to a reproduced signal obtained from the prior-art disc of FIG. 1. The reproducing clock signal is synchronized with data in the reproduced signal. The prior-art drive device extracts the address information from the reproduced signal in response to the reproducing clock signal. During an initial stage of the drive of the prior-art disc, until the rotational speed of the disc rises to a rated value, the PLL circuit remains in an unlocked state so that an accurate reproducing clock signal is unavailable and hence the address information can not be correctly recovered.

With reference to FIG. 2, in the case where first one of the land pre-pits 104-1 fails to be detected and then second one thereof is successfully detected, it is impossible to decide which of three candidate land pre-pits corresponding to the first, second, and third crests of the groove wobble 103 in every other sync frame agrees with the detected land pre-pit until the next land pre-pits 104-2 are detected and then the arrangement thereof is decided. Thus, in this case, address information can not be correctly recovered until the land pre-pits 104-2 are detected and then the arrangement thereof is decided.

In the prior-art disc of FIG. 1, the address information is recorded only at fixed on-disc positions to enable accurate synchronization to be obtained during the scanning of the disc. Accordingly, the freedom of recording positions for the address information is considerably limited.

As previously mentioned, Japanese patent application publication number 2003-36544 discloses a prior-art optical recording medium which is an information recording carrier having a groove forming a recording track. The groove track has wobbling portions and non-wobbling portions. Each wobbling portion is assigned to an address-information bit of "1" while each non-wobbling portion is assigned to an address-information bit of "0". Accordingly, the prior-art optical recording medium has recorded address information.

A prior-art drive device for the prior-art optical recording medium in Japanese application 2003-36544 includes a phase locked loop (PLL) circuit for generating a reproducing clock signal in response to a reproduced signal obtained from the medium. The reproducing clock signal is synchronized with data in the reproduced signal. The prior-art drive device extracts the address information from the reproduced signal in response to the reproducing clock signal. During an initial stage of the drive of the prior-art optical recording medium, until the rotational speed of the medium rises to a rated value, the PLL circuit remains in an unlocked state so that an accurate reproducing clock signal is unavailable and hence the address information can not be correctly recovered.

During the drive of the prior-art optical recording medium in Japanese application 2003-36544, the difference between a reference signal generated by the PLL circuit and a reproduced signal originating from either a wobbling portion or a non-wobbling portion of the groove track is detected. Then, a decision is made as to whether the reproduced signal comes from a wobbling portion or a non-wobbling portion, that is, whether the reproduced signal corresponds to an information bit of "1" or "0" on the basis of the detected difference. Accordingly, until the rotational speed of the prior-art optical recording medium rises to a rated value, wobbling portions and non-wobbling portions of the groove track can not be accurately discriminated and hence the address information can not be correctly extracted.

The correct recovery of the address information is expected provided that every boundary between a wobbling portion of the groove track and a non-wobbling portion thereof is accurately detected.

Embodiment

Figure 3:
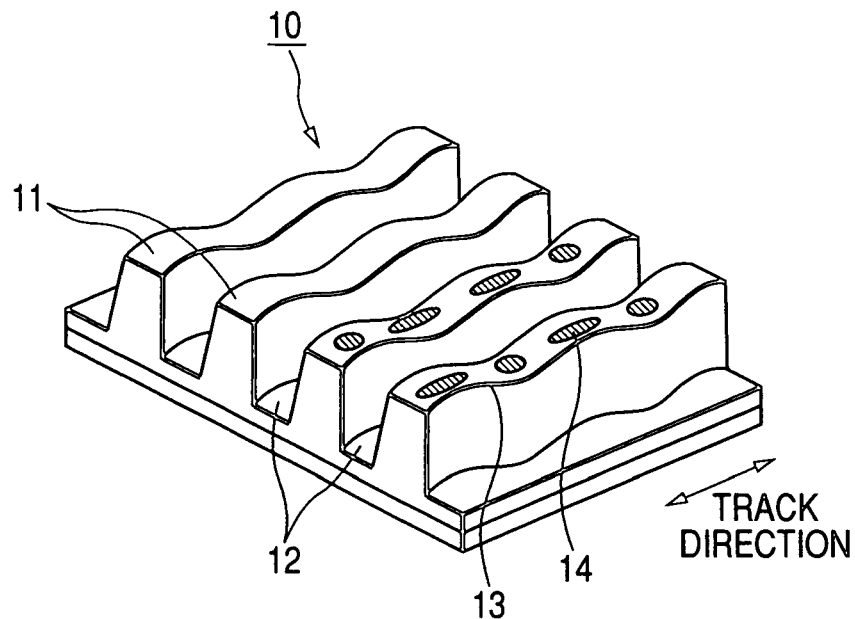
FIG. 3 is a perspective view of a portion of an optical recording medium (an optical disc) according to an embodiment of this invention.

FIG. 3 shows a portion of an optical disc (an optical recording medium) 10 according to an embodiment of this invention. The optical disc 10 has a spiral guide groove 11 forming a recording track. During the recording of data on the optical disc 10, a spot of a laser beam emitted from an optical pickup of a drive device is guided along the groove track 11 while forming recorded marks 14 therein. As viewed along a radial direction of the optical disc 10, adjacent portions of the guide groove 11 are spaced at a constant track pitch. In FIG. 3, there are land portions 12 between the adjacent portions of the guide groove 11. It should be noted that the guide groove 11 may be of a shape different from the spiral.

The sides of the groove track 11 (or the sides of the land portions 12) wobble in a direction perpendicular to the longitudinal direction of the groove track 11, that is, in a widthwise direction of the groove track 11. The wobble of the sides of the groove track 11 is denoted by the reference numerals "13". The wobble 13 continuously extends along the groove track 11. It should be noted that the wobble 13 may be formed along only one side of the groove track 11. The wobble 13 is based on a signal resulting from frequency modulation responsive to address information. In other words, a signal resulting from frequency modulation responsive to address information is recorded on the optical disc 10 as the wobble 13 continuously formed along the groove track 11 on the optical disc 10. Thus, the address information is modulated into a frequency-modulation-result signal (a wobble-corresponding signal) before being recorded on the optical disc 10 as the wobble 13.

The wobble 13 has a prescribed waveform such as a rectangular waveform or a sinusoidal waveform. The wobble 13 is divided into low-frequency portions and high-frequency portions. The low-frequency portions alternate with the high-frequency portions. The low-frequency portions have a first predetermined frequency (a predetermined fundamental frequency). The high-frequency portions have a second predetermined frequency double the first predetermined frequency. Thus, the wobble 13 is divided into fundamental-frequency portions and double-frequency portions corresponding to the low-frequency portions and the high-frequency portions. Preferably, every low-frequency portion (every fundamental-frequency portion) is chosen to represent a signal bit of "0" while every high-frequency portion (every double-frequency portion) is chosen to represent a signal bit of "1". Alternatively, every low-frequency portion (every fundamental-frequency portion) may be chosen to represent a signal bit of "1".

In this case, every high-frequency portion (every double-frequency portion) is chosen to represent a signal bit of "0".

A drive device can record and reproduce data on and from the optical disc 10. Furthermore, the drive device can erase data from the optical disc 10. During the recording of data on the optical disc 10, the drive device scans the groove track 11 while applying a laser beam of a recording power level thereto and forming recorded marks 14 therein. During the reproduction of data from the optical disc 10, the drive device scans the groove track 11 while applying a laser beam of a reproducing power level thereto and receiving a portion of a reflected laser beam coming therefrom. The drive device recovers data from the received laser beam. During the erasure of data from the optical disc 10, the drive device scans the groove track 11 while applying a laser beam of an erasing power level thereto.

It should be noted that recorded marks 14 may be formed in both the groove track 11 and the land 12. Alternatively, recorded marks 14 may be formed in only the land 12.

Basically, the address information recorded as the wobble 13 represents the positions of places on the optical disc 10. Preferably, the address information contains data selected from at least one of (1) data representing absolute addresses assigned to respective segments of the whole recording surface of the optical disc 10, (2) data representing relative addresses assigned to respective partial regions in the optical disc 10, (3) data representing a track number, (4) data representing a sector number, (5) data representing a frame number, (6) data representing a field number, (7) data representing time, (8) data representing a used error correction code, (9) data representing the category of the optical disc 10, and (10) data representing parameters such as a desired rotational speed of the optical disc 10 and a desired power of the laser beam for data recording. The data contained in the address information is binary, and may result from the conversion of an original signal representing decimal or hexadecimal values. Thus, the data contained in the address information is of a binary code, a BCD code, or a Gray code.

First address information (original address information) is encoded into second address information. The second address information consists of words of a self-synchronizable code. A comma-free code (a prefix code) is used as the self-synchronizable code. According to the comma-free code, the boundary between code words is decided and hence the code-word-based synchronization is established provided that symbols, the number of which is equal to a given value or less, are observed.

Figure 4:
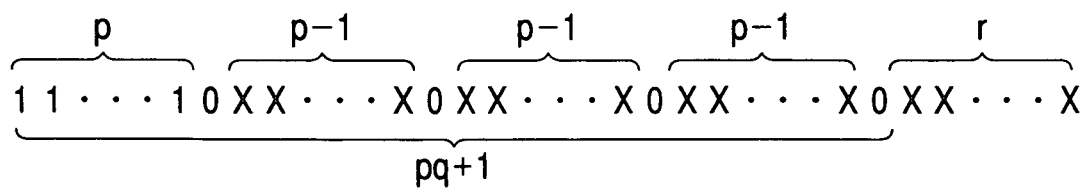
FIG. 4 is a diagram showing the structure of one word of a comma-free code (a self-synchronizable code) in the embodiment of this invention.

With reference to FIG. 4, one word of the comma-free code consists of a prefix and a body following the prefix. The prefix occupies a word head. The prefix consists of "p" successive bits of "1", where "p" denotes a predetermined natural number. The body consists of check-point bits and information bits. Specifically, the body includes "q" bits of "0" defined as check points (non-prefix check points), where "q" denotes a predetermined natural number. The check points are spaced at equal intervals corresponding to "p−1" bits. The first check point immediately follows the prefix. The body also includes information bits "X". Bits placed between the check points are used as information bits "X". Furthermore, "r" bits immediately following the last check point are also used as information bits "X", where "r" denotes a predetermined natural number. Bits in the original address information (the first address information) are assigned to information bits "X" in the second address information respectively. Therefore, each information bit "X" is "1" or "0" as an indication of the logic state of a corresponding bit in the original address information. The bits of "1" which constitute the prefix are also defined as check points (prefix check points). The total number "d" of the check-point bits in one word is thus equal to "p+q". The total number "k" of the information bits "X" in one word is equal to "(p−1)∘(q−1)+r".

To attain the code-word-based synchronization, it is necessary to satisfy the following relation.

$$r \leq p \circ q \qquad (1)$$

This fact is confirmed by considering the case where the bit number "r" is maximum and is hence equal to "p∘q", and a sequence of the "r" information bits is the same in contents as a sequence of the prefix bits and the subsequent bit or bits in the present code word. In this case, a bit immediately following the sequence of the "r" information bits (a "p∘q+1"-th bit counted from the first bit in the sequence of the "r" information bits) is a second bit in the next code word, that is, a prefix check-point bit of "1". On the other hand, a "p∘q+1"-th bit counted from the first bit in the present code word is a non-prefix check-point bit of "0" (see FIG. 4). Accordingly, it is possible to detect the boundary between the last information bit in a code word and the prefix in the next code word. Thus, the position of the prefix of every code word can be detected, and the code-word-based synchronization can be established.

It should be noted that the prefix may be of a bit sequence pattern which differs from the pattern formed by bits of "1" and which does not appear in an information bit sequence.

In the case where the optical disc 10 is a DVD-R (digital versatile disc recordable) or a DVD-RW (digital versatile disc rewritable) without land pre-pits, one word of the comma-free code is designed so that the predetermined natural numbers "p", "q", and "r" are equal to 2, 2, and 3 respectively. Thus, one word of the comma-free code has a fixed length corresponding to 8 bits (p∘q+1+r, that is, 2∘2+1+3).

Figure 5:
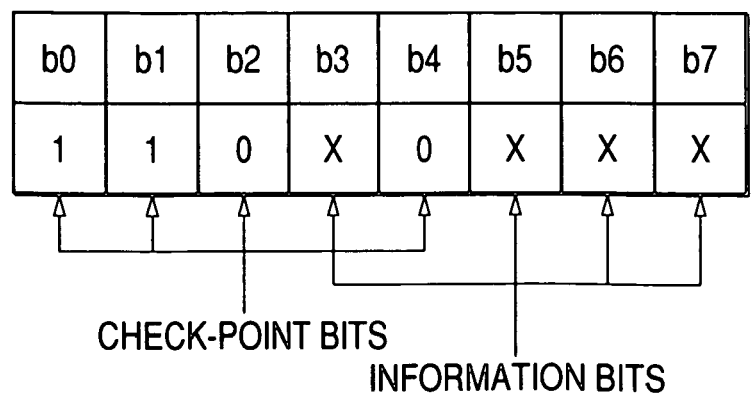
FIG. 5 is a diagram showing the structure of one 8-bit word of a comma-free code (a self-synchronizable code) in the embodiment of this invention.

As shown in FIG. 5, one word of the comma-free code consists of 8 successive bits b0, b1, b2, b3, b4, b5, b6, and b7. The bits b0, b1, b2, and b4 are used as check-point bits while the bits b3, b5, b6, and b7 are used as information bits. The bits b0, b1, b2, b3, b4, b5, b6, and b7 are sequentially recorded in that order.

Each of the check-point bits b0 and b1 is "1". The check-point bits b0 and b1 constitute a prefix. Each of the check-point bits b2 and b4 is "0", forming a non-prefix check point. Each of the bits b3, b5, b6, and b7 is an information bit "X".

It is preferable that every 8-bit word of the comma-free code is assigned to one sync frame.

Figures 6, 7, 8:
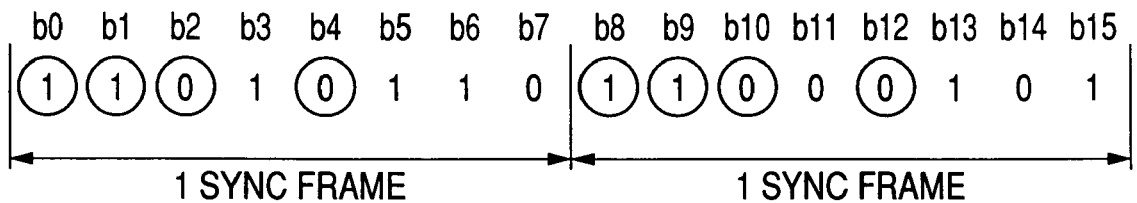
FIG. 6 is a diagram showing an example of two successive 8-bit words of the comma-free code.
FIG. 7 is a diagram showing the relation between bits in a signal occurring before bi-phase modulation and corresponding bits in a signal occurring after the bi-phase modulation in the embodiment of this invention.
FIG. 8 is a diagram showing an example of a bit sequence in the signal occurring before the bi-phase modulation and an example of a corresponding bit sequence in the signal occurring after the bi-phase modulation.

FIG. 6 shows an example of two successive code words each assigned to one sync frame and having the structure same as that of the code word of FIG. 5. In FIG. 6, bits constituting the former word are denoted by b0-b7, and bits constituting the latter word are denoted by b8-b15. The bits b0 and b1 are check-point ones being "1" and constituting the prefix of the former word. The bits b2 and b4 are non-prefix check-point ones being "0". The bits b8 and b9 are check-point ones being "1" and constituting the prefix of the latter word. The bits b10 and b12 are non-prefix check-point ones being "0". The bits b3, b5, b6, and b7 are information bits in the former word. The bits b11, b13, b14, and b15 are information bits in the latter word.

In FIG. 6, the check-point bits b0, b1, and b2 form a bit sequence of "110", and the information bits b5, b6, and b7 also form a bit sequence of "110". The fourth later bit b4 counted from the first bit (the first check-point bit) b0 is a check-point bit of "0". On the other hand, the fourth later bit b9 counted from the information bit b5 is a check-point bit of "1". By detecting that the fourth later bit b9 is "1", it is possible to decide that "110" represented by the bits b5-b7 is an information bit sequence rather than a check-point bit sequence. Furthermore, it is possible to detect the boundary between the last information bit b7 in the former word and the prefix in the latter word which is formed by the check-point bits b8 and b9.

As previously mentioned, the original address information is converted into words of the self-synchronizable code (the comma-free code or the prefix code). In this case, it is possible to detect the boundary between the last information bit in a code word and the prefix in the next code word which is formed by the check-point bits. Under the conditions where the words of the self-synchronizable code are assigned to sync frames respectively, the sync-frame-based synchronization can be surely established. Under these conditions, four information bits can be recorded for every sync frame when each code word consists of 8 bits as shown in FIGS. 5 and 6.

As previously mentioned, it is possible to detect the boundary between the last information bit in a code word and the prefix in the next code word which is formed by the check-point bits. Thus, places in the optical disc 10 where a stream of code words should be recorded are not limited to prescribed ones. Therefore, a stream of code words can be recorded while being dispersed over a freely selected area in the optical disc 10. Since the address information is recoded on the optical disc 10 as the wobble 13 of the groove track 11, the usable recording capacity of the optical disc 10 is prevented from decreasing due to the recording of the address information.

A stream of self-synchronizable code words (the second address information) is converted into a wobble-corresponding signal through frequency modulation. An example of the frequency modulation is as follows. The stream of self-synchronizable code words is converted into a stream of words of another code (an NRZ code) through bi-phase modulation. Namely, the second address information is converted into third address information, that is, bi-phase-modulation-result information. As will be made clear later, the bi-phase modulation causes frequency modulation.

The bi-phase modulation will be described hereafter. With reference to FIG. 7, every bit of "0" in the self-synchronizable code-word stream is assigned to a modulation-result code word being two channel bits of "00" or "11". Thus, every bit of "0" in the self-synchronizable code-word stream is converted to two successive bits of "00" or "11". Every bit of "1" in the self-synchronizable code-word stream is assigned to a modulation-result code word being two channel bits of "10" or "01". Thus, every bit of "1" in the self-synchronizable code-word stream is converted to two successive bits of "10" or "01". The states of modulation-result code words are decided so as to obey the following rule. The logic state of the first bit in a modulation-result code word is an inversion of that of the second bit in the immediately-preceding modulation-result code word.

It should be noted that every bit of "0" in the self-synchronizable code-word stream may be assigned to a modulation-result code word being two channel bits of "10" or "01". In this case, every bit of "1" in the self-synchronizable code-word stream is assigned to a modulation-result code word being two channel bits of "00" or "11".

With reference to FIG. 8, a bit sequence of "011110" in the self-synchronizable code-word stream is converted into a bit sequence of "001010101011" forming a part of the modulation-result code-word stream (the NRZ signal or the bi-phase-modulation-result signal). The self-synchronizable code-word stream tends to be of asymmetry between the probability of appearance of "0" and the probability of appearance of "1". On the other hand, the modulation-result code-word stream is substantially of symmetry. Furthermore, the maximum "0" run and the maximum "1" run are equal to 2. Accordingly, the direct-current component of the modulation-result code-word stream is effectively suppressed. Therefore, the modulation-result code-word stream which has been recorded on the optical disc 10 can be stably and accurately reproduced therefrom.

Figure 9:
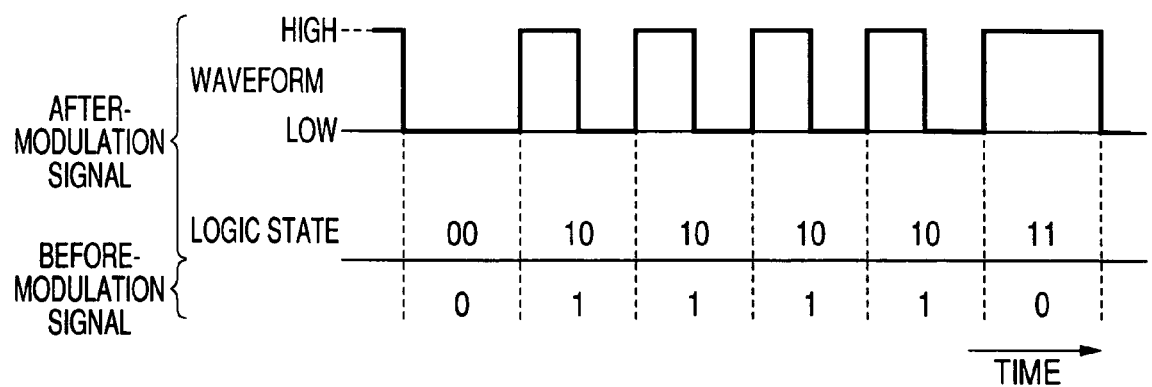
FIG. 9 is a time-domain diagram showing an example of a bit sequence in the signal occurring before the bi-phase modulation, a corresponding bit sequence in the signal occurring after the bi-phase modulation, and the corresponding waveform of the signal occurring after the bi-phase modulation.

FIG. 9 shows an example of the waveform of a part of the bi-phase-modulation-result signal. In FIG. 9, a bit sequence of "011110" in the self-synchronizable code-word stream (the before-modulation signal) is converted into a bit sequence of "001010101011" forming a part of the bi-phase-modulation-result signal (the NRZ signal, the modulation-result code-word stream, or the after-modulation signal). Regarding the bi-phase-modulation-result signal, a bit of "0" and a bit of "1" are assigned to a low signal level and a high signal level respectively. It should be noted that a bit of "0" and a bit of "1" may be assigned to a high signal level and a low signal level respectively. As shown in FIG. 9, during a time interval (a bit clock period) corresponding to a before-modulation bit of "0", the level of the bi-phase-modulation-result signal does not change at the central time point and exhibits a half wave. On the other hand, during a time interval (a bit clock period) corresponding to a before-modulation bit of "1", the level of the bi-phase-modulation-result signal changes at the central time point and exhibits one complete wave. Therefore, the frequency of every time segment of the bi-phase-modulation-result signal corresponding to a before-modulation bit of "1" is equal to twice that corresponding to a before-modulation bit of "0". Thus, the bi-phase-modulation-result signal is caused by frequency modulation responsive to the self-synchronizable code-word stream (the before-modulation signal). Accordingly, the bi-phase-modulation-result signal has fundamental-frequency time segments corresponding to respective before-modulation bits of "0", and double-frequency time segments corresponding to respective before-modulation bits of "1". As will be made clear later, the waveform of the bi-phase-modulation-result signal is directly recorded on the optical disc 10 as the wobble 13 of the groove track 11. Thus, the wobble 13 has fundamental-frequency portions corresponding to respective before-modulation bits of "0", and double-frequency portions corresponding to respective before-modulation bits of "1".

It should be noted that the waveform of the bi-phase-modulation-result signal may be sinusoidal rather than rectangular.

As understood from the previous description, the bi-phase modulation causes frequency modulation responsive to the before-modulation signal (the self-synchronizable code-word stream). The frequency of the bi-phase-modulation-result signal is equal to the fundamental value or the double value depending on whether a corresponding bit in the before-modulation signal is "0" or "1". In other words, the frequency of the bi-phase-modulation-result signal changes between the fundamental value and the double value in accordance with the logic states of bits in the before-modulation signal.

Figure 10:
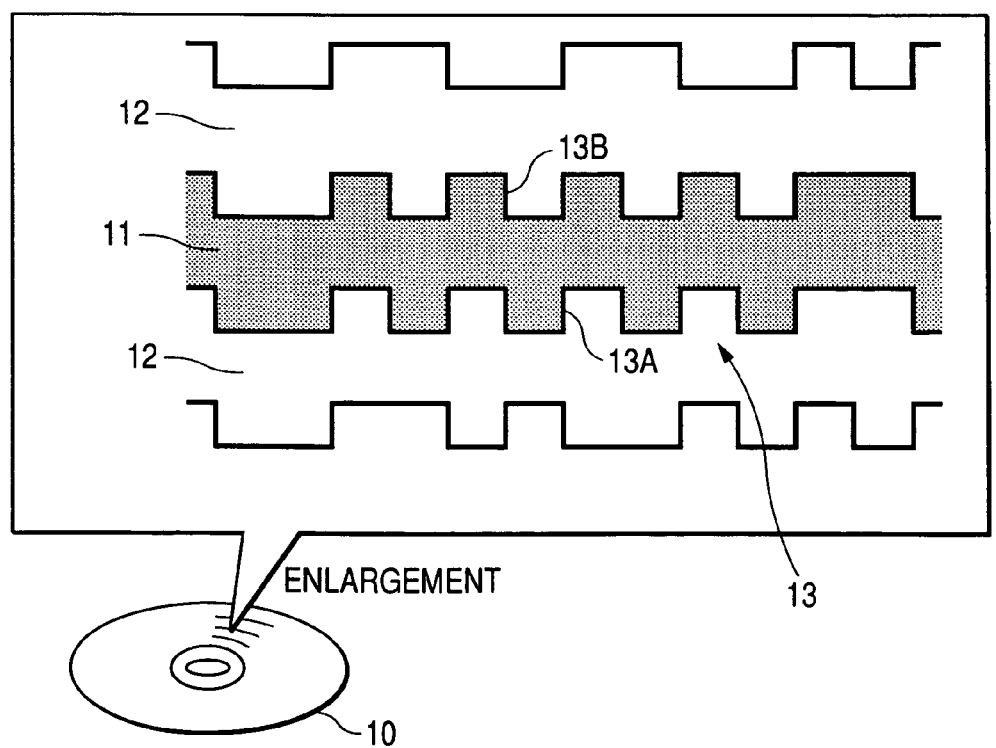
FIG. 10 is a diagram having a perspective view of the optical disc and an enlarged view of a portion of the optical disc in the embodiment of this invention.

With reference to FIG. 10, the waveform of the bi-phase-modulation-result signal (the frequency-modulation-result signal) in FIG. 9 is directly recorded on the optical disc 10 as corresponding portions 13A and 13B of the wobble 13 of the groove track 11. The wobble (the wobble portion) 13A is formed along the inner circumferentially-extending side of the groove track 11 while the wobble (the wobble portion) 13B is formed along the outer circumferentially-extending side thereof. It should be noted that only one of the wobbles (the wobble portions) 13A and 13B may be formed.

The drive device reproduces the bi-phase-modulation-result signal (the frequency-modulation-result signal) from the wobble 13 in the optical disc 10 while scanning the groove track 11 thereon. The drive device converts the reproduced signal back to the self-synchronizable code-word stream through bi-phase demodulation (frequency demodulation). The bi-phase demodulation can be easily implemented by observing the level inversion intervals of the reproduced signal. The drive device decodes the self-synchronizable code-word stream into the original address information.

Even when the rotational speed of the optical disc 10 is below a rated value, the bi-phase-modulation-result signal (the frequency-modulation-result signal) is reliably reproduced from the optical disc 10. Then, the reproduced bi-phase-modulation-result signal is correctly demodulated into the self-synchronizable code-word stream since the bi-phase demodulation can be easily implemented by observing the level inversion intervals of the reproduced signal. Every boundary between code words in the self-synchronizable code-word stream can be easily detected by observing checkpoint bits therein. Since code words are assigned to sync frames respectively, the detection of every boundary between code words enables the sync-frame-based synchronization to be surely established. The use of the self-synchronizable code relaxes the limitation on the places in the optical disc 10 where the address information should be recorded. Accordingly, the address information can be recorded in freely selected places in the optical disc 10.

The prefix of every comma-free code word (every self-synchronizable code word) can also be used as a runup for a PLL circuit in the drive device.

Figure 11:
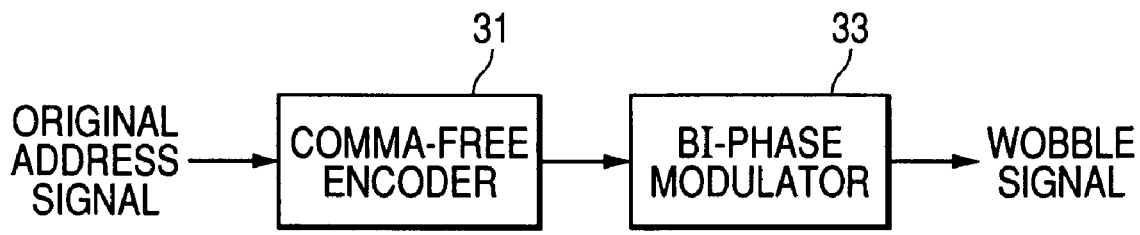
FIG. 11 is a block diagram of a signal processing apparatus in the embodiment of this invention.

FIG. 11 shows a signal processing apparatus in the embodiment of this invention. The apparatus of FIG. 11 includes a comma-free encoder 31, and a bi-phase modulator (a frequency modulator) 33 connected to the comma-free encoder 31.

The comma-free encoder 31 receives an original address signal (original address information) representing the positions of places on an optical disc 10. The comma-free encoder 31 divides the original address signal into segments each having 4 bits. The comma-free encoder 31 converts every 4-bit segment of the original address signal into a corresponding 8-bit word of the comma-free code (the self-synchronizable code) in the previously-mentioned way. Specifically, the comma-free encoder 31 sequentially assign four bits of every 4-bit segment of the original address signal to four information bits in a corresponding 8-bit word of the comma-free code. The comma-free encoder 31 sequentially outputs the resultant comma-free code words to the bi-phase modulator 33.

The bi-phase modulator 33 subjects a bit stream of the comma-free code words to bi-phase modulation (frequency modulation) to generate a bi-phase-modulation-result signal in the previously-mentioned way. The bi-phase modulator 33 outputs the bi-phase-modulation-result signal (the frequency-modulation-result signal) to an external apparatus as a wobble-corresponding signal having a rectangular waveform or a sinusoidal waveform. The wobble-corresponding signal has fundamental-frequency time segments (low-frequency time segments) and double-frequency time segments (high-frequency time segments). Every bit of "0" in the comma-free code-word stream is assigned to one of a fundamental-frequency time segment and a double-frequency time segment of the wobble-corresponding signal while every bit of "1" therein is assigned to the other. The wobble-corresponding signal contains the original address information, and represents groove-track wobble 13 to be formed in an optical disc 10.

Figure 12:
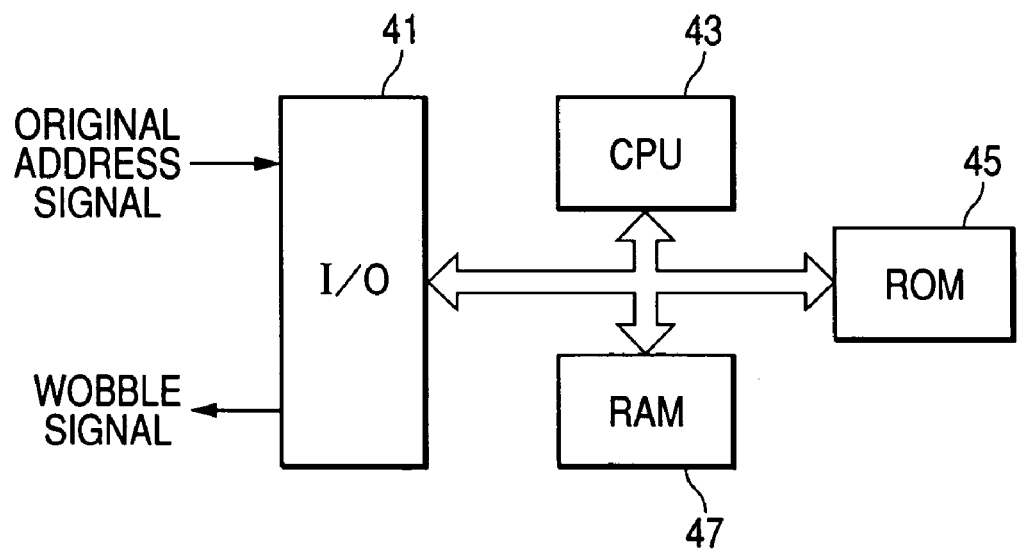
FIG. 12 is a block diagram of another signal processing apparatus in the embodiment of this invention.

FIG. 12 shows another signal processing apparatus in the embodiment of this invention. The apparatus of FIG. 12 replaces the apparatus of FIG. 11. The apparatus of FIG. 12 includes a computer or a digital signal processor having a combination of an input/output circuit 41, a CPU 43, a ROM 45, and a RAM 47. An original address signal (original address information) is fed to the input/output circuit 41. The original address signal represents the positions of places on an optical disc 10. The apparatus of FIG. 12 processes the original address signal into a wobble-corresponding signal according to a control program (a computer program) stored in the ROM 45 or the RAM 47. The wobble-corresponding signal is sent to an external apparatus via the input/output circuit 41.

For example, the control program for the apparatus of FIG. 12 is loaded into the RAM 47 from a recording medium via the input/output circuit 41. The control program may be downloaded to the RAM 47 via a communication network and the input/output circuit 41.

Figure 13:
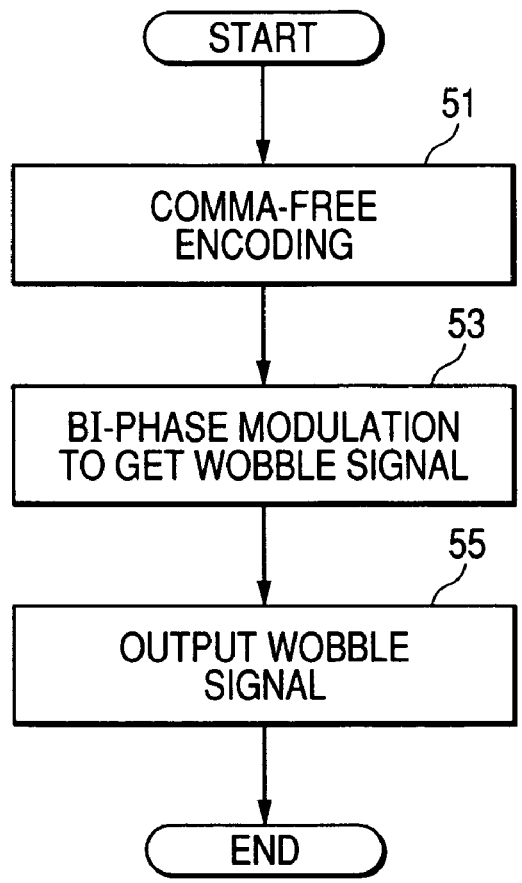
FIG. 13 is a flowchart of a control program for the signal processing apparatus in FIG. 12.

FIG. 13 is a flowchart of the control program for the apparatus of FIG. 12. As shown in FIG. 13, a first step 51 of the program divides the original address signal into segments each having 4 bits. The step S1 converts every 4-bit segment of the original address signal into a corresponding word of the comma-free code (the self-synchronizable code) in the previously-mentioned way.

A step 53 following the step 51 subjects a bit stream of the comma-free code words to bi-phase modulation (frequency modulation) to generate a bi-phase-modulation-result signal, that is, a wobble-corresponding signal, in the previously-mentioned way. The wobble-corresponding signal has fundamental-frequency time segments and double-frequency time segments. Every bit of "0" in the comma-free code-word stream is assigned to one of a fundamental-frequency time segment and a double-frequency time segment of the wobble-corresponding signal while every bit of "1" therein is assigned to the other.

A step 55 subsequent to the step 53 outputs the wobble-corresponding signal to an external apparatus. The wobble-corresponding signal contains the original address information. The waveform of the wobble-corresponding signal is rectangular or sinusoidal. After the step 55, the current execution cycle of the program ends.

Figure 14:
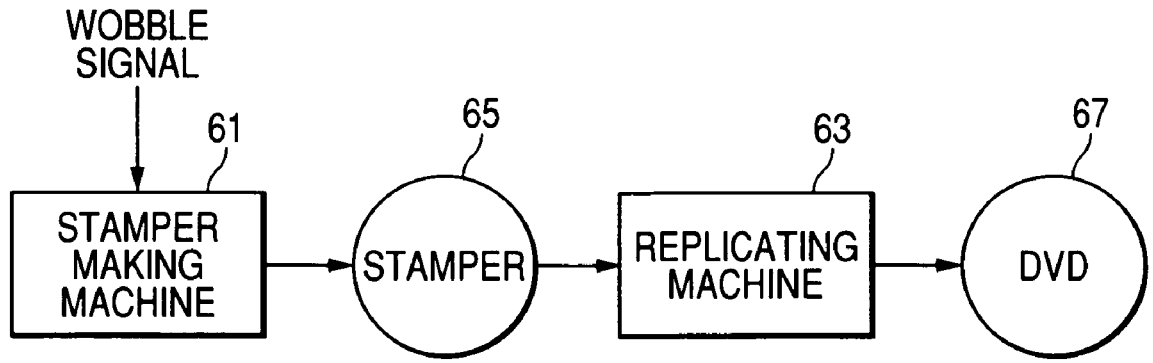
FIG. 14 is a diagram of a DVD manufacturing system in the embodiment of this invention.

FIG. 14 shows a DVD manufacturing system in the embodiment of this invention. The system of FIG. 14 includes a conventional stamper making machine 61 and a conventional replicating machine 63.

The wobble-corresponding signal generated by the apparatus of FIG. 11 or FIG. 12 is fed to the stamper making machine 61. The stamper making machine 61 generates a DVD stamper 65 in response to the wobble-corresponding signal. Specifically, the stamper making machine 61 forms track wobble in the DVD stamper 65 in accordance with the wobble-corresponding signal. Thus, the track wobble has fundamental-frequency portions (low-frequency portions) and double-frequency portions (high-frequency portions) accorded with the fundamental-frequency time segments and the double-frequency time segments of the wobble-corresponding signal.

The replicating machine 63 is loaded with the DVD stamper 65. The replicating machine 63 produces virgin DVDs 67 through a molding process using the DVD stamper 65 and post-molding processes such as a metalizing process and a coating process. Each produced DVD 67 has a groove track 11 with wobble 13 corresponding to the track wobble in the DVD stamper 65. Thus, the wobble 13 of the groove track 11 has fundamental-frequency portions (low-frequency portions) and double-frequency portions (high-frequency portions) accorded with the fundamental-frequency time segments and the double-frequency time segments of the wobble-corresponding signal. In this way, the address signal contained in the wobble-corresponding signal is recorded on each produced DVD 67 as the wobble 13 of the groove track 11. Each produced DVD 67 is of the recordable type or the rewritable type, and can be used as the optical disc 10 in FIG. 3.

What is claimed is:

1. A method of recording address information on an optical recording medium having groove portions and land portions, the groove portions forming a recording track and being spaced at a constant track pitch, the land portions extending between the groove portions, the address information representing positions of places on the optical recording medium, the method comprising the steps of:
   converting the address information into words of a self-synchronizable comma-free code, wherein each of the words includes check-point bits representative of a fixed bit pattern and information bits representative of a corresponding portion of the address information;
   subjecting the words of the self-synchronizable comma-free code to bi-phase modulation causing frequency modulation to generate a frequency-modulation-result signal; and
   recording the frequency-modulation-result signal on at least one sides of the groove portions to form wobble of the recording track.

2. An optical recording medium having groove portions and land portions, the groove portions forming a recording track and being spaced at a constant track pitch, the land portions extending between the groove portions, wherein a frequency-modulation-result signal containing address information is recorded on at least one sides of the groove portions to form wobble of the recording track, the address information representing positions of places on the optical recording medium and being expressed by words of a self-synchronizable comma-free code wherein each of the words includes check-point bits representative of a fixed bit pattern and information bits representative of a corresponding portion of the address information.

3. A method comprising the steps of:
   encoding an original address signal into a signal of a self-synchronizable comma-free code, wherein the signal of the self-synchronizable comma-free code has words each including check-point bits representative of a fixed bit pattern and information bits representative of a corresponding portion of the original address signal; and
   subjecting the signal of the self-synchronizable comma-free code to frequency modulation to generate a frequency-modulation-result signal representing track wobble to be formed in an optical recording medium.

4. A method as recited in claim 3, further comprising the step of making an optical recording medium in response to the frequency-modulation-result signal, the optical recording medium having the track wobble represented by the frequency-modulation-result signal.

5. A method comprising the steps of:
   encoding an original address signal into a signal of a self-synchronizable comma-free code, wherein the signal of the self-synchronizable comma-free code has words each including check-point bits representative of a fixed bit pattern and information bits representative of a corresponding portion of the original address signal; and
   subjecting the signal of the self-synchronizable comma-free code to bi-phase modulation to generate a bi-phase-modulation-result signal representing track wobble to be formed in an optical recording medium.

6. A method as recited in claim 5, further comprising the step of making an optical recording medium in response to the bi-phase-modulation-result signal, the optical recording medium having the track wobble represented by the bi-phase-modulation-result signal.

7. An apparatus comprising:
   means for encoding an original address signal into a signal of a self-synchronizable comma-free code, wherein the signal of the self-synchronizable comma-free code has words each including check-noint bits representative of a fixed bit pattern and information bits representative of a corresponding portion of the original address signal; and
   means for subjecting the signal of the self-synchronizable comma-free code to frequency modulation to generate a frequency-modulation-result signal representing track wobble to be formed in an optical recording medium.

8. An apparatus as recited in claim 7, further comprising means for making an optical recording medium in response to the frequency-modulation-result signal, the optical recording medium having the track wobble represented by the frequency-modulation-result signal.

9. An apparatus comprising:
   means for encoding an original address signal into a signal of a self-synchronizable comma-free code, wherein the signal of the self-synchronizable comma-free code has words each including check-point bits representative of a fixed bit pattern and information bits representative of a corresnonding portion of the original address signal; and
   means for subjecting the signal of the self-synchronizable comma-free code to bi-phase modulation to generate a bi-phase-modulation-result signal representing track wobble to be formed in an optical recording medium.

10. An apparatus as recited in claim 9, further comprising means for making an optical recording medium in response to the bi-phase-modulation-result signal, the optical recording medium having the track wobble represented by the bi-phase-modulation-result signal.

11. An optical recording medium having a recording track with wobble formed in accordance with a bi-phase-modulation-result signal which is generated by the steps of encoding an address signal representative of positions of places in the optical recording medium into a signal of a self-synchronizable comma-free code, and subjecting the signal of the self-synchronizable comma-free code to bi-phase modulation, wherein the signal of the self-synchronizable comma-free code has words each including check-Doint bits representative of a fixed bit pattern and information bits representative of a corresponding portion of the address signal.

* * * * *